(12) United States Patent
Pfleging et al.

(10) Patent No.: US 9,337,462 B2
(45) Date of Patent: May 10, 2016

(54) ELECTROLYTE BATTERIES

(75) Inventors: Wilhelm Pfleging, Bruchsal (DE);
Robert Kohler, Karlsruhe (DE);
Johannes Pröll, Karlsruhe (DE)

(73) Assignee: Karlsruher Institut fur Technologie (KIT) (DE)

( * ) Notice: Subject to any disclaimer, the term of this patent is extended or adjusted under 35 U.S.C. 154(b) by 207 days.

(21) Appl. No.: 14/110,744

(22) PCT Filed: Apr. 12, 2012

(86) PCT No.: PCT/DE2012/000383
§ 371 (c)(1),
(2), (4) Date: Dec. 20, 2013

(87) PCT Pub. No.: WO2012/139553
PCT Pub. Date: Oct. 18, 2012

(65) Prior Publication Data
US 2014/0315066 A1    Oct. 23, 2014

(30) Foreign Application Priority Data

Apr. 14, 2011 (DE) .......... 10 2011 017 058
Apr. 20, 2011 (DE) .......... 10 2011 018 373
Apr. 21, 2011 (DE) .......... 10 2011 018 616

(51) Int. Cl.
*H01M 2/18* (2006.01)
*H01M 4/04* (2006.01)
*H01M 10/0525* (2010.01)
*H01M 10/0569* (2010.01)
*H01M 4/13* (2010.01)
*B23K 26/00* (2014.01)
*H01M 4/02* (2006.01)

(52) U.S. Cl.
CPC ............ *H01M 2/18* (2013.01); *B23K 26/00* (2013.01); *H01M 4/0435* (2013.01); *H01M 4/13* (2013.01); *H01M 10/0525* (2013.01); *H01M 10/0569* (2013.01); *H01M 2004/021* (2013.01); *H01M 2004/025* (2013.01); *Y02E 60/122* (2013.01); *Y02P 70/54* (2015.11); *Y02T 10/7011* (2013.01); *Y10T 29/49108* (2015.01)

(58) Field of Classification Search
CPC ............ H01M 2/18; H01M 10/0525; H01M 10/0569; H01M 4/13; H01M 4/0435; H01M 2004/025; H01M 2004/021; B23K 26/00; Y02E 60/122; Y01T 29/49108; Y01T 10/7011; Y02P 70/54
See application file for complete search history.

(56) References Cited

U.S. PATENT DOCUMENTS

| 2002/0106566 A1 * | 8/2002 | Nemoto et al. ............ 429/224 |
| 2005/0053833 A1 | 3/2005 | Hayashida et al. |
| 2010/0279158 A1 | 11/2010 | Kumakari et al. |
| 2011/0039140 A1 | 2/2011 | Miyahisa et al. |

FOREIGN PATENT DOCUMENTS

| DE | 103 43 535 | 12/2004 |
| DE | 10 2006 035 468 | 6/2008 |
| EP | 0 967 672 | 12/1999 |
| EP | 0967672 | * 12/1999 ............ H01M 4/02 |
| JP | 2002 015764 | 1/2002 |
| JP | 2003 197265 | 7/2003 |

* cited by examiner

*Primary Examiner* — Patrick Ryan
*Assistant Examiner* — Aaron Greso
(74) *Attorney, Agent, or Firm* — Salter & Michaelson (57) ABSTRACT

The invention relates to an electrolyte battery electrode component having a layer having a surface adjoined by electrolyte in the battery and provided with a fluid-conducting channel structure. In this context, it is envisaged that through the fluid-conducting structure has channels having channel depths in the range from 10 to 200 μm and/or at least 50% of the thickness of the active layer.

18 Claims, 9 Drawing Sheets

Fig. 7

ELECTROLYTE BATTERIES

BACKGROUND OF THE INVENTION

The present invention relates to what has been claimed in the preamble and thus refers to the field of energy storage means.

In order to be able to give good supply of electrical energy to mobile electrical devices, machines and vehicles, high-performance energy storage means are required. The demands on such energy storage means are growing with the desire to be able to open up new applications or to be able to provide higher-performance equipment, for example for electrical/hybrid vehicles. Energy storage means are typically rechargeable batteries, which are also referred to as accumulators or as secondary cells.

In principle, batteries consist of two different electrodes, between which there is an electrolyte. In the case of lithium ion batteries, for example, one electrode, namely the negative electrode, is formed from graphite, while the positive electrode may be formed from lithium metal oxide. In general, it is desirable to be able to draw large currents from an energy storage means over a prolonged period. In order to ensure this, the electrodes are made thin and are arranged closed to one another. Between the electrodes, specifically in the case of particularly compact batteries with low electrode separation, there is an electrically insulating separator permeable to the ions of the electrolyte, which prevents internal short circuits.

In order to be able to form a thin electrode, it is already known that the electrode starting material can be provided in powder form and the electrode can be produced from this starting material by means of film casting. Film casting is a primary shaping process for production of thin, large-area ceramic films, in which the ceramic powder—here the lithium-containing ceramic powder—is processed with the aid of suitable substances and additives to give a free-flowing casting slip. In a film casting system, this ceramic slip can be applied, for example, to a continuous metal foil and smoothed continuously under a coating bar. The slip layer thus obtained can be dried and processed further.

An advantage of such electrodes is the high porosity, which leads, after filling with an electrolyte, to low maximum diffusion pathways of the charge carriers from the electrode material into the electrolyte, and hence rapid charging and discharging of the battery.

There have already been proposals to use thin electrode layers, for example layers having thicknesses below 5 μm, as producible by HF magnetron sputtering, for improvement of the electrochemical properties of a battery in which corresponding electrodes are used, by means of short UV laser pulses. This introduces additional conical pores into the material. The improvement achieved in the electrochemical battery properties through such compact thin layers is attributed to the fact that the diffusion pathways of the lithium ions through the material toward the electrolyte are shortened because of the laser structuring, which is said to enable more rapid charging or discharging of the battery cell.

The literature also describes the increase in the surface areas of thin-film electrodes for improvement of the battery properties using the term "three-dimensional battery". In this context, there have already been studies of prestructuring of the substrate and the subsequent deposition of electrodes on the substrate structures obtained. Reference should be made, for example, to the review article "Three-dimensional Battery Architectures" by J. W. LONG et al., Chem. Ref. 2004, 104, 4463-4492.

With regard to the known techniques mentioned, reference should be made firstly to the article "Laser annealing of textured thin film cathode material for lithium ion batteries" by R. KOHLER et al., Laser-based Micro- and Nano-Packaging and Assembly IV, Proceedings of SPIE, Volume 7585, p. 758500-11. Reference should also be made to the article "Laser-assisted structuring and modification of $LiCoO_2$ thin films" by R. KOHLER et al., Proceedings of the SPIE (2009), Volume 7202, p. 720207-720207-11, and to the article "Patterning and annealing of nano-crystalline $LiCoO_2$ thin films" by R. KOHLER et al., Journal of Optoelectronics and Advanced Materials, Volume 12, No. 3, March 2010, pages 547-552.

As regards films for electrochemical components and processes for production thereof, reference should be made, merely by way of example, to EP 1 230 708 B1.

Reference should also be made to DE 699 27 556 T2 and the articles "High Energy Density All-Solid-State Batteries: A Challenging Concept towards 3D Integration" by LOIC BAGGETTO et al., Advanced Functional Materials 18 (2008), 1057-1066, and to the article "Nanomaterials for rechargeable lithium batteries" by P. G. BRUCE et al., Angewandte Chemie-International Edition, 2008, 47(16), p. 2930-2946, and the article "3D Micro Batteries" by R. W. HART et al., Electrochemistry Communications 5 (2003), p. 120-123.

A specific problem in the case of high-performance energy storage means arises in the production of the cell. In this context, it has to be ensured that the electrolyte is distributed homogeneously between the electrodes. If this is not assured, meaning that the electrolyte is distributed inhomogeneously during the cell assembly, the areas of the electrode not wetted by the electrolyte cannot be utilized for the storage of electrical charge; the cell does not reach the specified capacity and can fail prematurely. The achievement of a homogeneous electrolyte distribution during the cell production is thus a quality-determining process step. For this reason, the filling of the cell, according to the prior art, is performed in a process which envisages multiple filling with alternate production of a vacuum in the space between the cell package and the electrode stack and subsequent aging for several hours. This operation is exceptionally time-consuming and is associated with various manual operating steps and therefore costly.

It is desirable to be able to improve the properties of a battery, especially when large-area elements with low spacing which come into contact with electrolyte are to be introduced into the battery. More particularly, but not exclusively, it is desirable to improve properties of electrodes formed from pulverulent material and/or with a thickness of the active material of more than 10 μm.

US 2005/0053833 A1 discloses a nonaqueous electrolyte battery, the electrode arrangement of which has a high-density positive electrode in which the positive electrode material is formed on at least one surface of the positive electrode current collector, and in which a separator interposed between the positive and negative electrodes is provided, and in which a structure in which the electrode arrangement is formed with a nonaqueous electrolyte is formed, wherein the specific surface area per unit area of the layer of active material of the active material layer of the positive electrode is 0.5 to 1.0 times the specific surface area per unit area of the active material layer of the negative electrode which opposes the positive electrode with the separator therebetween.

DE 103 43 535 C5 discloses a separator for lithium-polymer batteries with a profiled surface, wherein the separator is 10 to 40 μm thick and the profiled surface has a profile depth of 3 to 5 μm.

DE 10 2006 035 468 A1 discloses provision of modified electrodes for electrical energy storage means, more particularly for lithium ion batteries, having a structured surface. In this case, the intention is to structure a cathode electrode, this structuring being effected simultaneously in the course of production in a laminator. Capillaries are produced. In the course of filling of the cells, these capillaries are supposed to conduct the electrolyte, as a result of their capillary action, onward into the middle of the wound cathode electrodes, i.e. into the middle of the cell. This enables filling of the lithium ion cells in a single step.

It is an object of the present invention to provide something novel for commercial use. Preferred embodiments can be found in the dependent claims.

SUMMARY OF THE INVENTION

The present invention is accordingly also concerned with production processes which have an advantageous effect on the filling, assembly and performance of electrolyte batteries, more particularly through the introduction of fluid-conducting structures for homogeneous and reproducible cell filling, in which context it should be mentioned that the structuring of porous pulverulent electrode materials improves the cycling stability of the electrolyte battery, especially at high charging and discharging rates, and increases the cell lifetime through introduction of electrolyte reservoirs.

In the present context, what is described first of all is an electrolyte battery component having a surface which is adjoined by electrolyte in the battery and which has been provided with a surface structure. In this context, it is envisaged that the surface has been provided with a fluid-conducting structure in order to accelerate electrolyte fluid transport in the course of cell filling. Thus, reliability is additionally increased, since the whole area of the electrode is wetted by the electrolyte.

Even more specifically, according to a first basic concept of the invention, an electrolyte battery electrode component having a layer having a surface adjoined by electrolyte in the battery and provided with a fluid-conducting channel structure, has been proposed, that the fluid-conducting structure has been formed with channels which have been deepened significantly, i.e. at least more than 50%, more preferably at least two thirds, especially preferably at least 75% of the thickness of the active layer down to a substrate carrier, i.e. with channel depths in the range from 10 to 200 µm.

Thus, in accordance with the invention, a fluid-conducting structure is created on the surface, which gives rise to faster, larger-area and more homogeneous wetting of the electrodes or the space between electrode and separator with the electrolyte as early as in the course of filling of the cell with the liquid electrolyte. The advantages can already be achieved when one of electrode and separator is structured in accordance with the invention so as to result in accelerated liquid transport along the fluid-conducting structures and into the adjacent porosities of the electrode material or of the separator through the capillary forces and the wetting properties (via adjusted surface energy). The inventive structuring does not just create the prerequisite for rapid wetting, which contributes to a reduction in the processing times required for battery production through a decrease in the battery aging times, but also achieves, through the more homogeneous wetting which is enabled in accordance with the invention, a long-term improvement in the battery performance and hence an extension of the lifetime, because dry cell regions are avoided. Thus, in spite of the shortening of the aging period of several hours required in the prior art for homogenization of wetting, performance improvements are achieved with the invention through suitable geometry selection for the surface structure.

In practical tests, microchannel structures having channel widths or depths in the range from 10 to 200 µm in conjunction with the liquid electrolytes used nowadays have been found to be particularly advantageous. Typically, a multitude of fluid-conducting structures such as microchannel structures will be provided on a large-area electrolyte battery component according to the invention. The distance between these channels or the like need not necessarily be exactly equidistant; it will preferably be in the region of a few micrometers to a few millimeters. If the distances are too great, the advantages of the invention which are otherwise possible do not arise to the desired and possible extent and degree. If the distances are too small, one possible adverse effect is that of mechanical instability in the course of processing. Incidentally, practical tests with standard electrolytes, which used ethylene carbonate and dimethyl carbonate in a ratio of 1:1 as the solvent and $LiPF_6$ as the conductive salt, have shown that a maximum of achievable rise heights is achieved for channel widths in the electrode material of less than or equal to 50 µm through the liquid-conducting structures. However, it is to be expected that, possibly depending on surface properties of the separators or electrodes, and the properties of the electrolytes used, different designs will be found to be particularly advantageous in each case. However, particularly also against this background, channel widths down to or below 100 µm are regarded as being preferable, further preferably down to or below 80 µm, especially preferably down to or below 60 µm. Reference should therefore be made to the possibility of determining advantageous dimensions through rise height determinations for given surface-electrolyte pairings.

The deep profiling according to the invention also improves the filling compared to the structures already known from the prior art and to a particular degree dispenses with the time-consuming heat treatment of the cells, which is otherwise possibly required for homogenization of the electrolyte wetting in the electrode through lowering of the electrolyte viscosities. In addition, the surface-to-volume ratio of the active material is increased and the interface between electrolyte and active material is thus enlarged, such that the electrochemical cyclability of the cells is improved, especially at high charge-discharge currents.

The inventive improvement is possibly also attributable to the fact that, in the course of electrochemical cycling, a solid-liquid phase (solid electrolyte interface, SEI) is formed, which can lead to electrolyte losses. The deep fluid-conducting structures of the present invention can at least partially compensate for the electrolyte losses caused as a result, by providing an electrolyte reservoir close to a relatively large proportion by volume of the active material layer, and possibly even in the course of operation allow better distribution of electrolyte which flows to the active layer from a reservoir far-removed from the material.

In addition, through an inventive design, it is possible to achieve higher charging and discharging rates for the same cell lifetime. In addition, there is also a reduced risk that the cell as a whole will fail, because it is possible to reduce the mechanical stresses which occur in electrode materials as a result of Li intercalation/deintercalation processes, which lead, respectively, to expansion and shrinkage of the active material in the course of charging and discharging. The reduced mechanical stresses, which are lower because of the deeper channels, lead to a reduced probability that layer material will become detached from the output conductor, and lead to reduced formation and reduced spread of cracks within the electrode layer, the reduced crack lengths being advantageous because cracks interrupt the electrical conduction paths between the active particles of the electrode layer and are thus extremely unfavorable for cell operation. It has been found that, regardless of the deep structuring, improved characteristics in this respect are established because cracks often divide upper regions of the active layer from the effective electrical connection to the output conductor. Since cracks additionally lead to new contact surfaces between the solid state and electrolyte, which promotes the formation of the solid-liquid phase and hence the unwanted consumption of electrolyte and active material, the deep fluid-conducting structures of the present invention have double action against adverse effects in this respect, in that crack formation is firstly reduced and, as mentioned, an electrolyte reservoir is secondly provided, such that the unwanted gradual increase in the internal resistance does not occur, or at least does not occur as quickly and to the extent known in the prior art, as a result of which increased thermal stresses in the cell need not be taken into account either, or at least not to the usual extent, and thermal runaway is counteracted. Thus, the deep structuring of the present invention also improves the cell reliability.

It should be disclosed that the introduction of hierarchical structures may possibly be advantageous, especially since these improve the desired more rapid lithium intercalation and deintercalation from the layer material and the transport of lithium into and out of deeper electrode layers, which effectively improves lithium diffusion because the required diffusion path lengths are shortened and the lithium diffusion cross sections are increased.

It should be pointed out that it is particularly simple to provide parallel channels as fluid-conducting structures, particularly when the structuring is followed by a division in order to obtain a multitude of independently usable electrolyte battery components from a large piece of the structured material, but that it is also possible to use geometries such as mesh structures, branching or lattice structures in order to achieve homogeneous wetting.

It is accordingly preferable when a multitude of channels are provided alongside one another, or a branching structure and/or a column-like structure is provided for the deep fluid-conducting structures of the invention. This is advantageous because injection of the electrolyte is typically effected from a point or an edge, rather than, say, a full-area electrolyte filling. Vein-like branching of the fluid-conducting structures, for example according to a leaf vein structure design, improves the electrolyte homogenization in the electrode both vertically and laterally with respect to the filling injection, even in the case of injection at virtually a single point. It should be mentioned that such structures can also be introduced directly, for example through embossing rolling or laser structuring.

It should be pointed out, however, that the present invention is not limited to purely vein-like designs of the fluid-conducting structures. Instead, any hierarchical structures are advantageous and may be preferred.

Thus, homogenization of liquid distribution via capillary forces and the like can be established in a controlled manner through variation of the structure geometries. It should incidentally be mentioned that intrinsic porosity of electrodes and separator material is capable of promoting distribution of the electrolyte which homogeneously and rapidly wets the surface over the entire material thickness.

It is especially preferred when different structure geometries from the group of: channel structures in the electrode material; near-surface column structures; conical surface structures on the electrode surface; micropores in the electrode surface; are combined, i.e. at least two elements from this group are provided together through controlled structuring. The channel structures are, as mentioned, advantageous because they enable rapid and homogeneous wetting of the electrodes and serve as an electrolyte reservoir, and compensate for mechanical stresses which occur at the microscopic level, such as during the charge-discharge cycle, through the assembly process, through transport or in operation, as caused by vibrations. The conical surface structures improve the electrolyte wetting further near to the surface. Column structures are preferred because, by virtue of the microscopic dimensions with preferred widths of 1 to 10 μm for the columns and the preferred typically high aspect ratios of 1 to 100, they are particularly suitable for enabling brief current peaks in the course of charging or discharging. The microscopic structures additionally prevent the spread of cracks particularly efficiently, and are suitable for compensating for critical mechanical stresses, even on the micro scale. Through combination of at least two elements from the aforementioned group, preferably of all the components, the advantages discussed can typically be obtained together. For example, it is also possible to superpose channel-shaped fluid-conducting structures, even with a fluid-conducting structure which branches in the manner of veins from a broader channel toward narrower channels, with microstructures which provide conical structures near to the surface, to introduce columns and, if appropriate, to produce microporosity. Micropores may serve here as further electrolyte stores within the electrode material, which ensures continuous conveying of fresh electrolyte to the electrochemical reaction interfaces between the solid state and electrolyte. The micropores are typically introduced with diameters between 500 nm and 10 μm and depths of 3 μm to 100 μm. It should be mentioned that they additionally improve the filling operation and the wetting.

The present invention is particularly advantageous for batteries which are to be used at particularly low temperatures. More particularly, the invention is usable for electrode components or electrolyte batteries which are to be used or have to be specified at temperatures below −5° C., preferably −20° C. At such low temperatures, the invention is effectively able to counteract the deterioration in the performance properties through changes in the liquid electrolyte, such as with regard to the rise in viscosity, the poorer mobility of lithium ions and the poorer conductivity. The deep structuring proposed counteracts this particularly efficiently, especially since the risk of deposition of metallic lithium at the anode is distinctly reduced as a result of insufficiently rapid uptake of lithium from the anode crystal structure. What has a particularly efficient effect here is that and if the structures go deep into the material, such that what is achievable is not just an improvement in the wetting during the filling, but a material exchange into and out of the active layer is also significantly promoted.

In a particularly preferred variant, the layer thicknesses of the active electrode material into which the deep fluid-conducting structures of the present invention are introduced will be between 30 and 150 μm. It is particularly preferable when the layer thicknesses of the active electrode material are between 40 and 120 μm. These thicknesses can be produced efficiently by manufacturing technology and are suitable for producing electrolyte batteries with typically desirable properties. The fluid-conducting structures are then introduced into electrode layers of such thickness, these typically being 70 to 100% of the electrode layer thicknesses. If the measure employed for the wetting achievable in the course of production of the overall battery is the maximum rise height of the electrolyte fluid in the structured electrodes, it is found that, in the case of narrow channels, an improvement in the rise height can be observed, and this increases with the material removal depth, whereas, in the case of broader channels, the rise height rises in a linear manner up to about 70% and the further rise in the rise height thereafter flattens off with the material removal depth. Through such a determination of the rise height characteristics, it is directly possible, for given combinations of channel widths and material thicknesses, to determine optimal channel depths, i.e. depths optimal for wetting. It should be mentioned that deeper structures may be advantageous, even when the rise height barely rises to any significant degree through further deepening. One remarkable observation here is that further positive effects occur on wetting; the same also applies to the channel widths of preferably down to or below 100 µm, especially preferably down to or below 80 µm, or even further preferably down to or below 60 µm. According to the desired effect or desired effect combination, different channel widths can be selected.

It should be mentioned in this respect that it is particularly preferable to use layer thicknesses >10 µm.

The present invention is also particularly advantageous for electrolyte batteries having an upper (voltage) switch-off limit which has to be strictly complied with for safety reasons. For instance, in the automotive industry, switch-off is required for particular applications, in order to avoid overloading of the cell, at a particular loading voltage (such as 4.2 volts for batteries with $Li_2MnO_4$ as cathode material). However, this material has characteristic charging voltage plateaus at 4.05 volts and 4.15 volts, and therefore shifts in this voltage plateau toward higher voltages as a result of cycling and degradation shorten the service life of the cell. The inventive structuring thus allows, even with compliance with the system-relevant boundary conditions, a higher number of cycles for the cells. This is especially true when charging is to be effected with elevated charging rates. It may occur here in the prior art that the upper voltage plateau has shifted upward from 4.15 volts to such an extent that it can no longer be used in the event of charging with not more than 4.2 volts. The material characteristics and the charging-discharging voltage are thus likewise improved significantly in accordance with the invention merely through the deeper structuring.

It should be mentioned that the electrolyte battery component according to the present invention may preferably be a separator or an electrode, especially a cathode such as a thin-film and/or powder-based electrode, especially composed of at least one of $LiNi_{1/3}Mn_{1/3}Co_{1/3}O_2$, $LiCoO_2$, $LiMn_2O_4$, $LiFePO_4$, graphite, and corresponding materials with doping.

More particularly, it is possible in accordance with the invention to structure a thin-film- and/or powder-based electrode. According to current but non-limiting findings, suitable electrode materials of powder-based electrodes for an inventive structuring are especially $LiNi_{1/3}Mn_{1/3}Co_{1/3}O_2$, $LiCoO_2$, $LiMn_2O_4$, $LiFePO_4$, graphite, and corresponding materials with doping.

It should be mentioned that anodes and/or separators can also be structured. It is especially possible to provide separators with structuring in addition to cathodes and/or anodes, in which case the anodes or cathodes are provided with an inventive deep structuring, whereas separators are not necessarily provided with very deep structuring with fluid-conducting structures.

Protection is also claimed for an electrolyte battery having a component according to the invention.

It should be mentioned that the inventive electrolyte battery will typically also have an anhydrous electrolyte, more particularly with a lithium salt as the conductive salt, meaning that it is preferably a lithium ion battery, for which a possible conductive salt is especially $LiPF_6$. As a preferred solvent for an electrolyte battery of the invention, it is possible to use ethylene carbonate and/or dimethyl carbonate, especially in a ratio of or close to 1:1. It should be mentioned that the specification of the solvent which was found to be suitable in practical tests for use with the invention is not intended to constitute a restriction of the disclosure only to these substances, nor is the specification of a preferred conductive salt, more particularly of a preferred lithium salt. Instead, it should be pointed out that the invention can be used with a multitude of different conductive salts, more particularly of different lithium salts and/or different solvents or solvent mixtures, as already described in the prior art, especially in textbooks.

It is clear that the inventive electrolyte battery components offer advantages especially in large-area batteries as currently produced using cast films. However, protection is also claimed for any other electrolyte batteries which comprise an inventive electrolyte battery component. It is particularly advantageous when the electrolyte battery is a lithium ion battery for which pulverulent electrode materials are used.

As applications of electrolyte batteries in which such powder-based electrode materials are used, mention should be made of stationary energy storage means and EV or HEV energy storage means for future automobiles. The structuring proposed here is particularly advantageous for such batteries, because particularly large electrolyte battery component areas have to be structured therein and the inventive fluid-conducting structures can be applied without any problem to large areas with very high process speed.

It should also be mentioned that the present invention is suitable for passivating the surfaces with the structures. The passivation can be effected in parallel with the structuring or in a downstream processing step. For passivation, it is especially possible to use ceramic oxides such as ITO, zinc oxides, etc., through which it is possible to optimize the interface between active material and liquid electrolyte; what is effectively formed is a synthetic active material-electrolyte interface. The passivation possible by the invention reduces the chemical degradation of the electrolyte battery and hence further improves the advantages already mentioned. It is preferable to undertake the electrolyte battery component of the invention by calendering, embossing or by means of laser.

For the direct structuring of electrodes or separators, the laser beam sources used may, for example, be solid-state lasers such as Yb:YAG lasers or Nd:YAG lasers and/or high-frequency ultrashort pulse lasers. It should be mentioned in this respect that, using appropriate electrolyte battery components, it was possible to produce test cells and pouch cells which led reproducibly to good results in battery tests.

It should be mentioned that structuring by means of UV laser radiation is possible in the case of laser structuring on the one hand, and, for example, by means of NIR solid-state lasers on the other hand. It should be mentioned that, by means of UV laser radiation, it is possible to structure both thin-film materials and powder-based materials.

It should further be mentioned that, through the use of pulsed solid-state lasers, especially of fiber lasers such as Yb:YAG with a wavelength around 1 µm, defined material removal is effected in the course of processing of the pulverulent electrode material in the focus of a focusing lens. It has been found in this context that, during the laser material removal process, barely any debris deposits arise on the material surface processed, such that unstructured material regions remain very substantially unaffected.

In this regard, the improvement in the cycling stability, even in the case of use of porous pulverulent electrode materials, through controlled material removal, such as by means of Yb:YAG laser radiation, has to be regarded as particularly surprising.

The direct laser structuring is preferably performed shortly after the formation of the electrode material layer, because the laser structuring promotes the drying of the electrode material, and hence the conventional electrode drying steps which may nevertheless follow downstream can be performed with reduced costs. Firstly, the laser structuring introduces energy into the material, the energy input being dependent on the laser pulse duration, the pulse frequency, the pulse energy density and the wavelength. The structuring, moreover, promotes the discharge of water from the material and possibly the removal of solvent residues from the electrode material, because diffusion is also promoted in the course of drying, which in turn saves costs overall.

Even though direct structuring by means of radiation sources such as laser beams is accordingly possible and can be performed with high process speed because the high pulse rates of pulsed lasers now achievable enable very high scan rates in the structuring of the material surface when the surface structures, for example in the form of lands, are produced by means of laser, and it is found that the powder form of the material is preserved in the course of this processing and the structuring at the flanks of the channel structures produced results in additional exposure of further agglomerates extending as far as the substrate, which can come into direct contact with the electrolyte as the ion conductor, it should be mentioned that other structuring processes are also possible.

For instance, in accordance with the invention, more particularly, structuring of the electrode material already distributed over a wide area can be undertaken by calendering. The material compaction conducted in the course of the calendering process is already part of the production process for large-area electrodes. Particularly advantageously, this process can now be effected in accordance with the invention, for example, by means of a structured calender roll, in which case the calender roll structures may include linear structures which are transferred to the electrode surface by the calendering process. Thus, compaction and structuring of the material could be effected in one and the same process step.

The negative structures required for the structure transfer by means of the calender roll in the calendering process are thus preferably provided in the calender roll itself. It should be mentioned that, for example, embossing processes would also be possible. These can be employed in addition to or in place of another structuring method.

As well as protection for electrolyte battery components and cells and electrolyte batteries which use them, protection is thus also claimed for a process for producing electrolyte battery components, in which an electrolyte fluid-conducting structure is preferably applied by structuring by means of a calender roll and/or by means of an embossing process and/or by means of laser.

It should be mentioned that the invention particularly offers advantages when it is used for large-area batteries, as currently being produced by conventional film casting, an improvement in properties being possible through the inventive structuring, especially laser structuring. It should also be mentioned that the improvement in utilization of electrode materials for batteries such as lithium ion batteries can be improved by means of surface structures either having channels or optionally having appropriately arranged and shaped columns, with the possibility of direct structuring of pulverulent electrode material.

DESCRIPTION OF THE DRAWINGS

The invention is illustrated hereinafter, merely by way of example, by the drawing. This shows.

DETAILED DESCRIPTION

Figure 1:
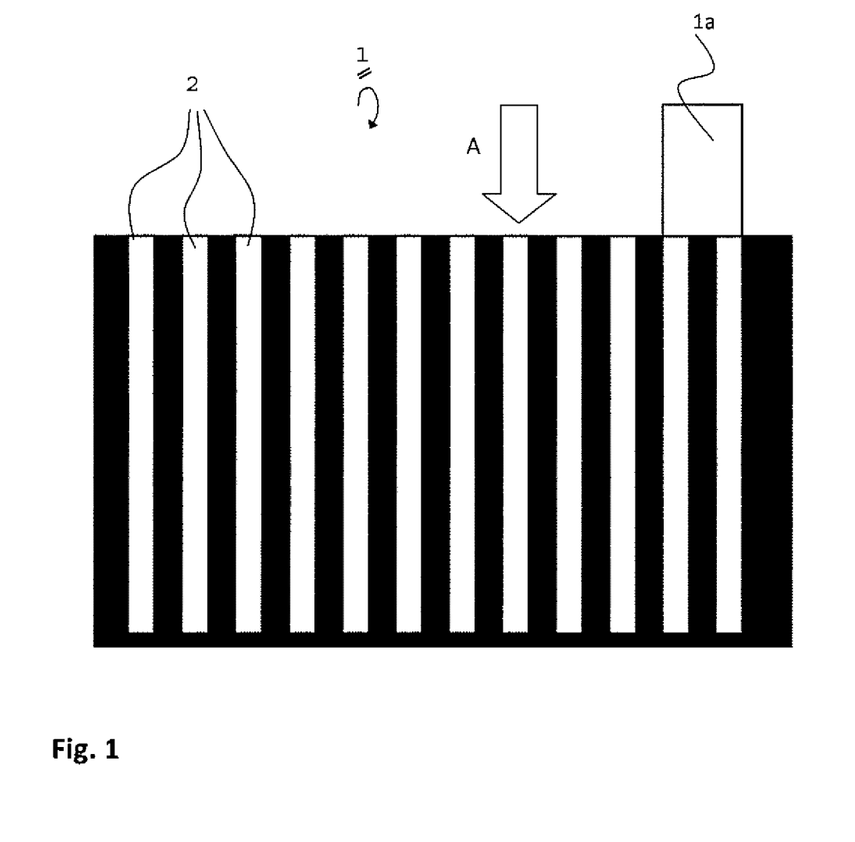
FIG. 1: a schematic diagram of a structured electrode.

In FIG. 1, an electrolyte battery component 1 generally designated 1 is formed as an electrode intended for an electrolyte battery from pulverulent material by a film casting process known per se. The surface of the electrolyte battery component 2 is provided with a surface structure 2 which, as a fluid-conducting structure, when an electrolyte battery cell is filled with liquid electrolyte during the battery production, is capable of accelerating the electrolyte fluid transport from the filling point at the top of the drawing, marked by arrow A.

In the present case, the electrode 1 is accordingly a powder-based electrode, the powder usable being, for example, one of $LiNi_{1/3}Mn_{1/3}Co_{1/3}O_2$, $LiCoO_2$, $LiMn_2O_4$, $LiFePO_4$, graphite, and appropriate materials with doping. The layer material is disposed on a substrate carrier which, in a manner known per se, has an output conductor 1a.

The liquid electrolyte used in the lithium ion battery may be an electrolyte comprising a lithium salt as the conductive salt, especially $LiPF_6$, and a solvent based on ethylene carbonate and dimethyl carbonate in a ratio of 1:1. Except for the inventive channel structures in the electrode and optionally corresponding channel structures in electrodes and optionally also in the separators structured in accordance with the invention (not shown), a battery which is formed with electrode 1 is otherwise conventional and is limited to the substances specified by way of example neither with regard to the electrode materials nor with regard to the electrolyte.

The channel structures indicated merely schematically in FIG. 1 have, as is yet to be explained with reference to FIG. 5, preferably a width between 40 and 150 µm, without being limited to exactly these values.

In the working example shown, the fluid-conducting structures of the invention introduced in accordance with the invention into the electrodes produced conventionally per se are produced by irradiation with a pulsed Yb:YAG solid-state fiber laser of suitable energy and with a laser wavelength around 1 µm, with selection of such a high scan rate of the laser beam over the electrode surface that defined material removal results in the focus of the focusing lens of the solid-state fiber laser.

Figure 2:
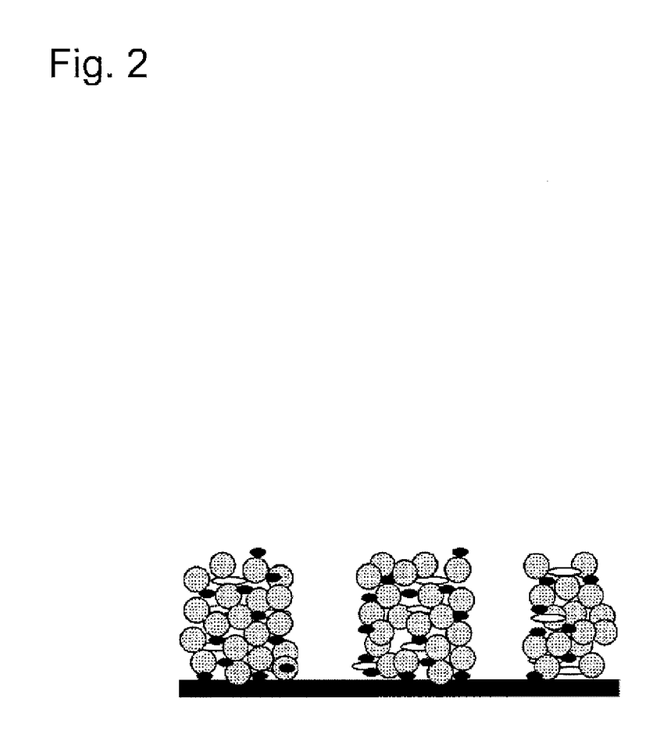
FIG. 2: electrode material, showing
  on the left: unstructured electrode material,
  on the right: structured electrode with detail enlargement (bottom)

FIG. 2 firstly shows an electron micrograph of the unstructured electrode material compared to the surface of an electrode surface provided with the inventive fluid-conducting structures. It is found that barely any debris deposits arise on the material surface during the laser material removal process, and so it is possible to leave unstructured material regions substantially unaffected.

An electrode in which an inventive fluid-conducting structure as described is introduced shall now be compared with an electrode not provided with a fluid-conducting structure of the present invention. For the comparison, conventional electrolyte as used for lithium ion batteries and as specified above is applied dropwise to electrodes and the distribution of the fluid on the electrode is observed during the application and immediately thereafter. The corresponding result is shown schematically in FIG. 3.

Figure 3:
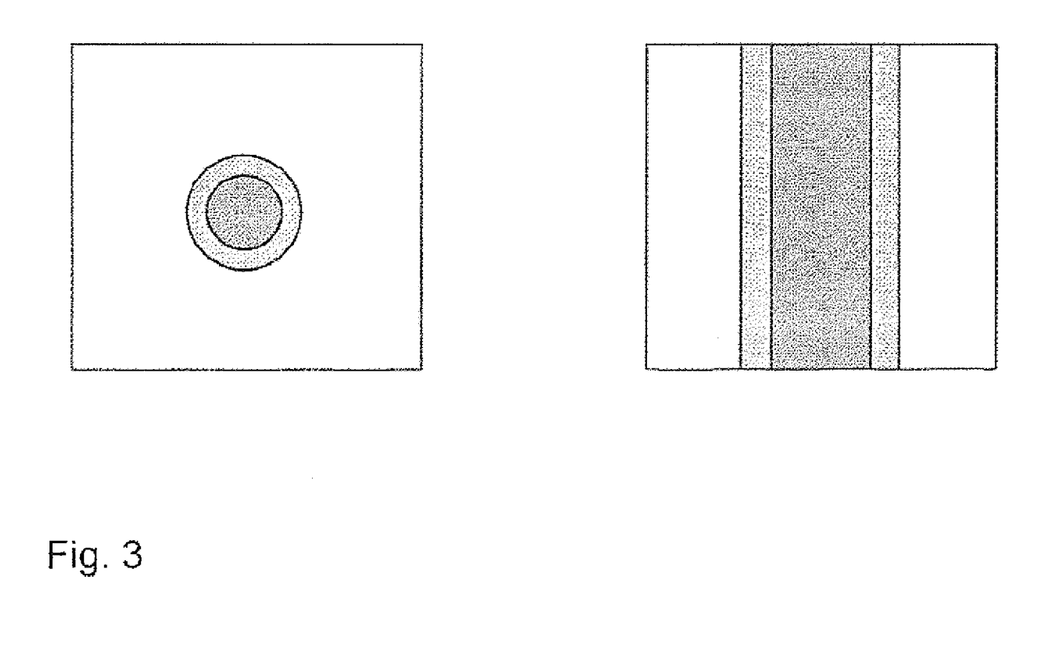
FIG. 3: schematic diagram of the electrolyte distribution after dropwise electrolyte application
  on the left: on an unstructured electrode according to the prior art and
  on the right: on an electrode structured in accordance with the invention.
Figure 4:
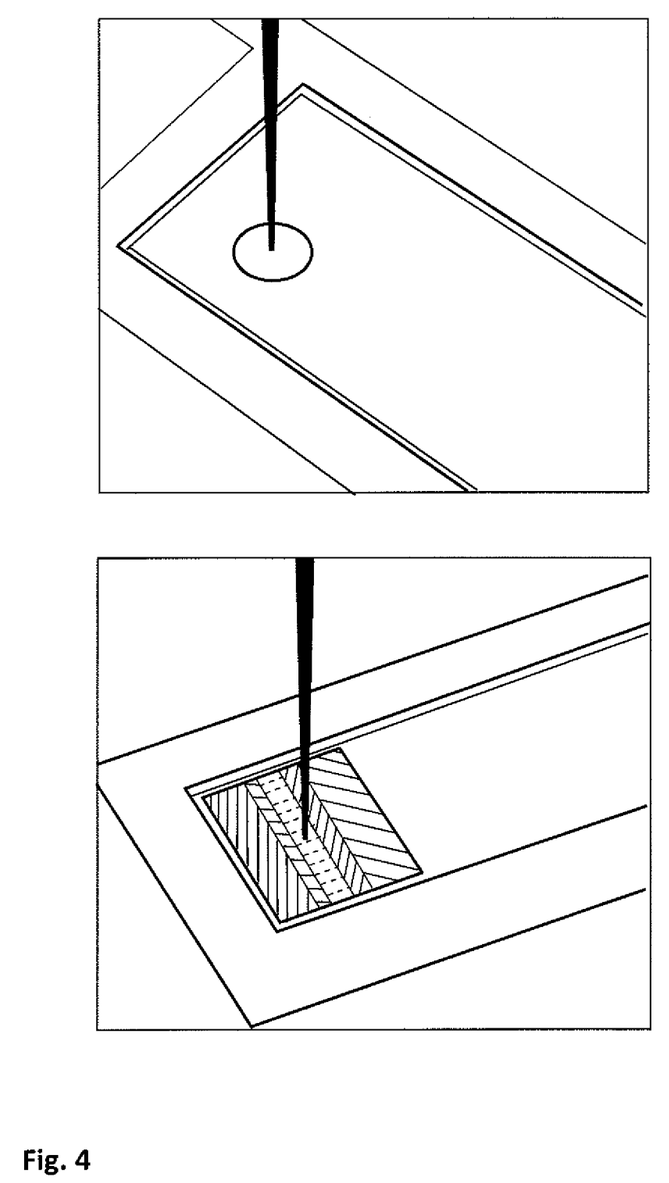
FIG. 4: the distribution of the electrolyte liquid directly after application of one drop of electrolyte liquid to the surface
  on the left: of an unstructured electrode surface according to the prior art,
  on the right: of a structured electrode surface according to the scheme of FIG. 3.

The comparison of dropwise application to an electrode with the inventive fluid-conducting structure and an unstructured electrode shows that the inventive fluid-conducting structure here, in the form of channel structures, has the effect on the electrolyte distribution that liquid transport proceeds along the channel structures, more specifically very rapidly compared to the distribution on a nonstructured electrode surface, and it is possible to observe firstly rapid wetting and secondly, moreover, more homogeneous wetting of the electrode with liquid electrolyte.

In practice, with regard to the situation, shown merely schematically in FIG. 3 for improved discernibility, it is found that, in wetting experiments on electrode material with a particular droplet volume of an electrolyte, immediately after droplet contact with the electrodes, as detectable, for example, by means of photographs, the droplet contact on an electrode provided with a fluid-conducting structure in accordance with the invention leads to significantly more homogeneous and faster wetting than on an unstructured electrode.

In order to quantify what channel widths are found to be particularly advantageous, channels of different widths were then introduced as fluid-conducting structures into electrode material samples, and the rise height of the aforementioned electrolyte was determined within a given limited time. The achievable rise height as a function of channel width is shown in FIG. 5. It is found that a maximum rise height is achieved in the region around channel width 50 µm, i.e. particularly advantageous fluid-conducting characteristics are attained.

Figure 5A:
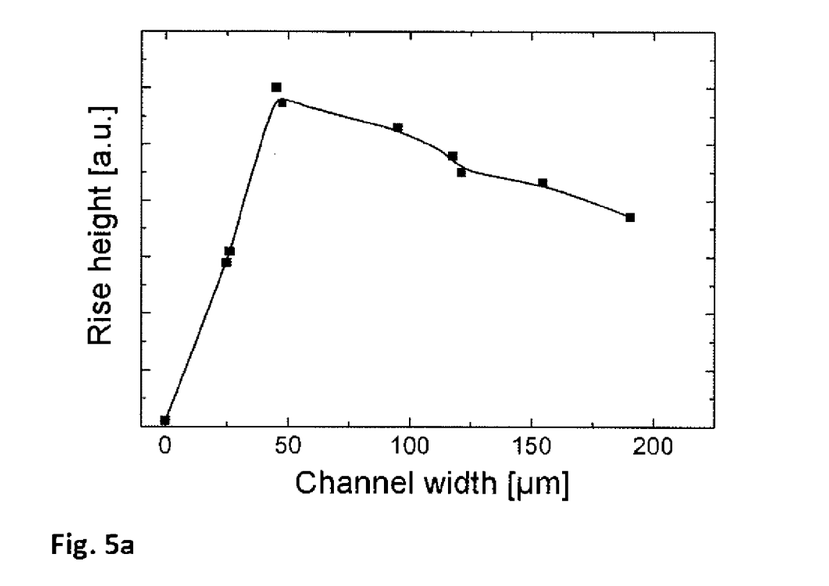
FIG. 5a: the rise height of an electrolyte on an electrode surface as a function of the channel width of a structure introduced into cast electrode material.
Figure 5B:
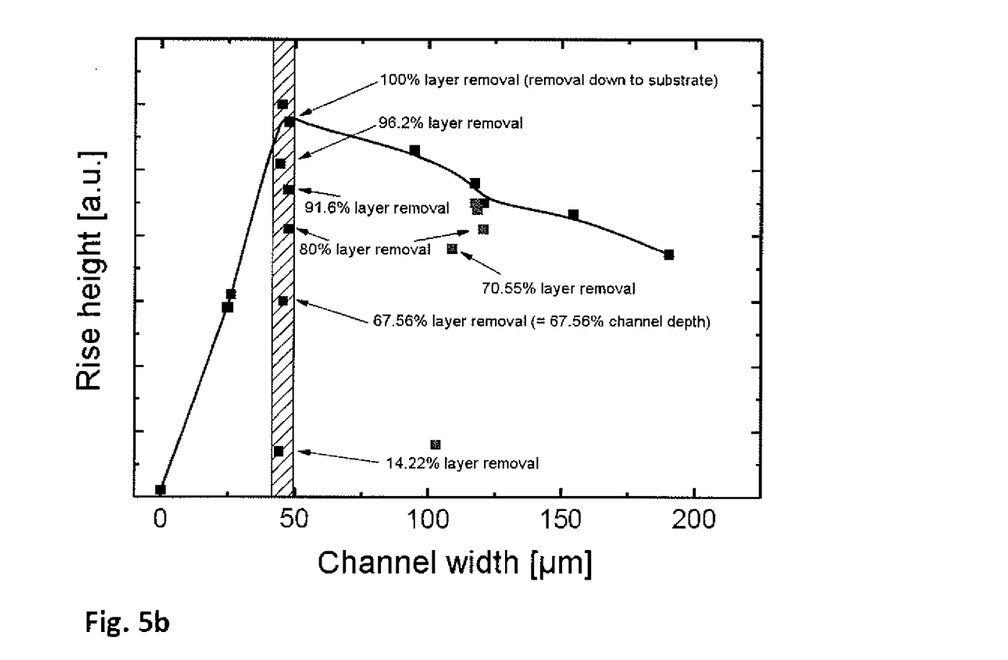
FIG. 5b: the diagram of FIG. 5a with rise heights for channels incorporated with different depths and channel widths of 100 μm (FIG. 5c) and 45 μm (FIG. 5d)
Figure 5C:
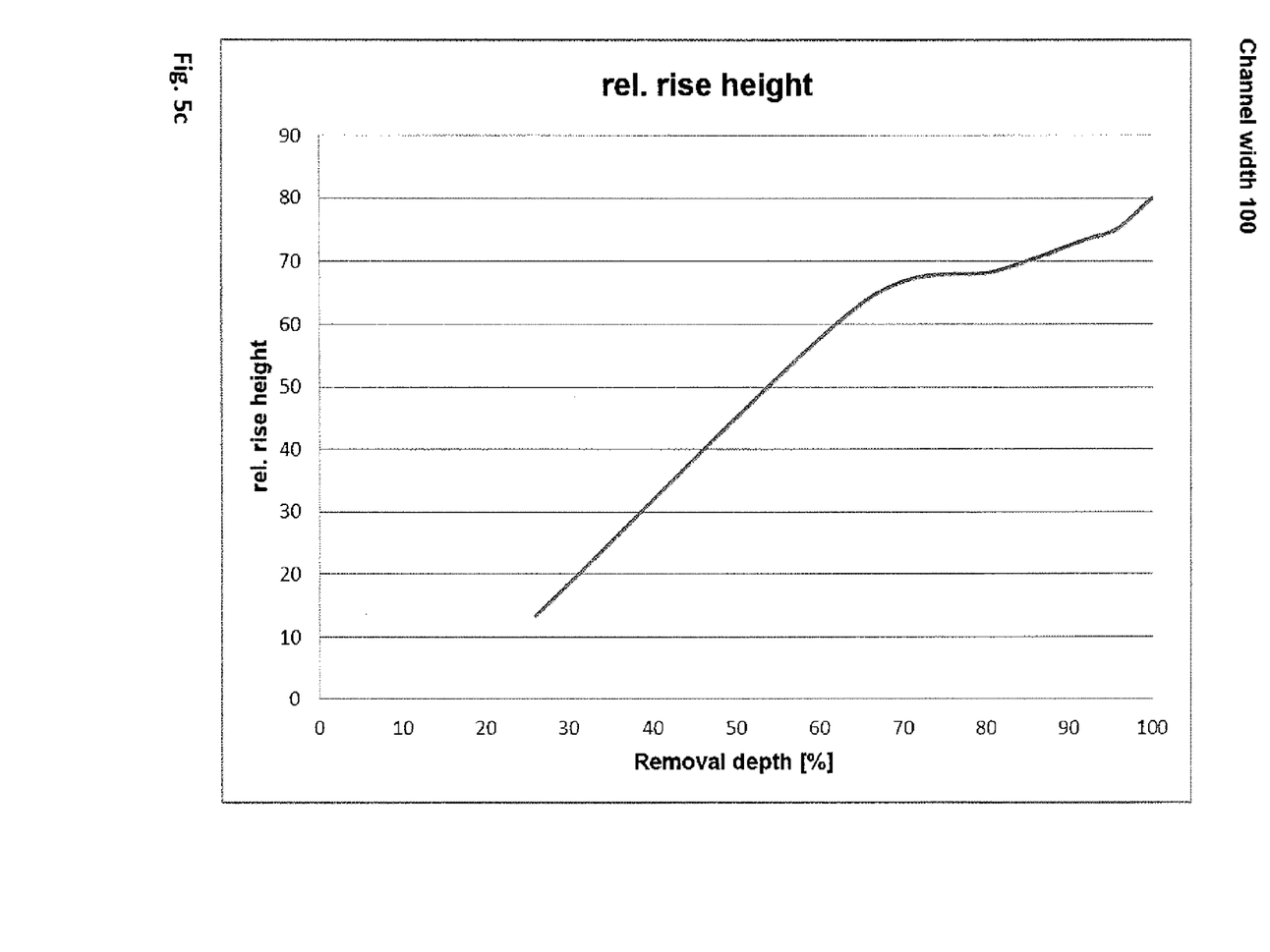
FIG. 5c,d: relative rise heights for different material removal depths for channels of different width.
Figure 5D:
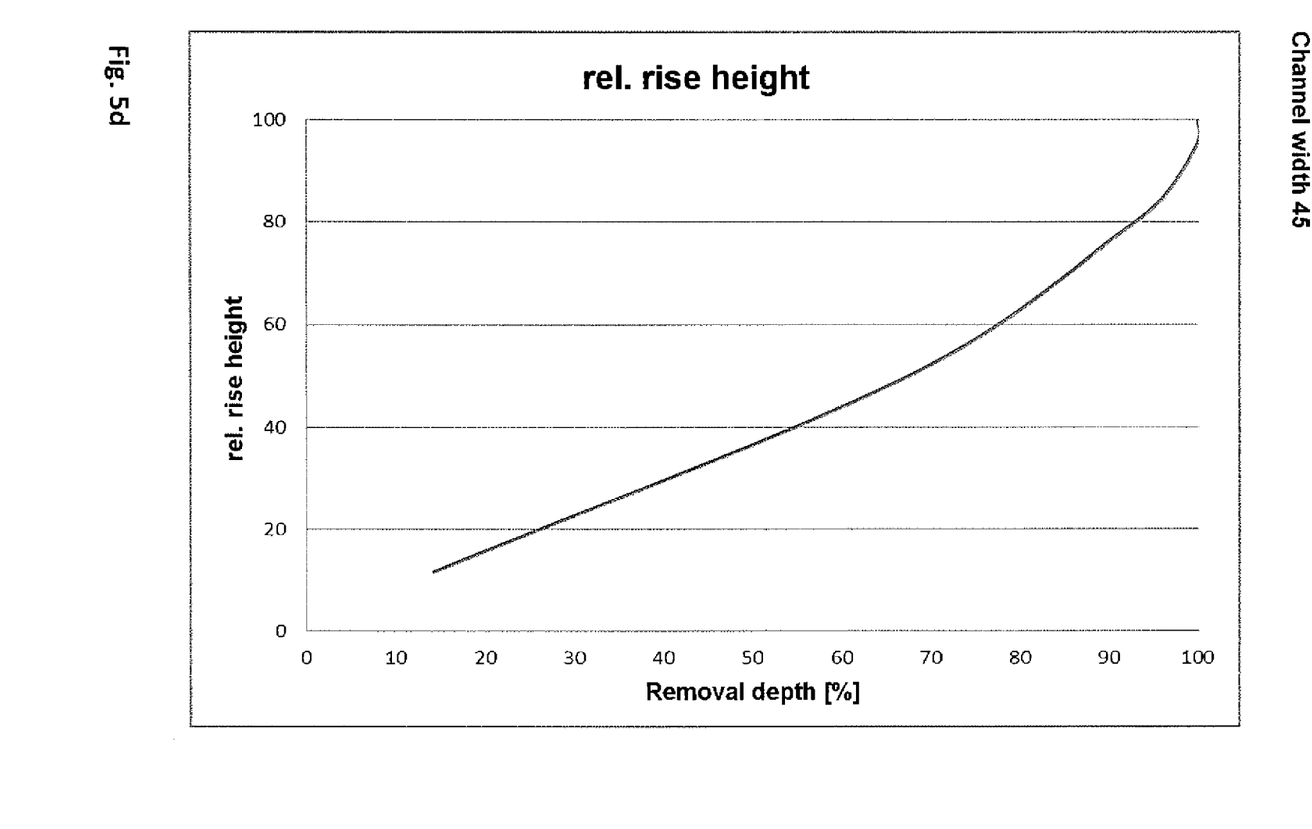
Figure 6:
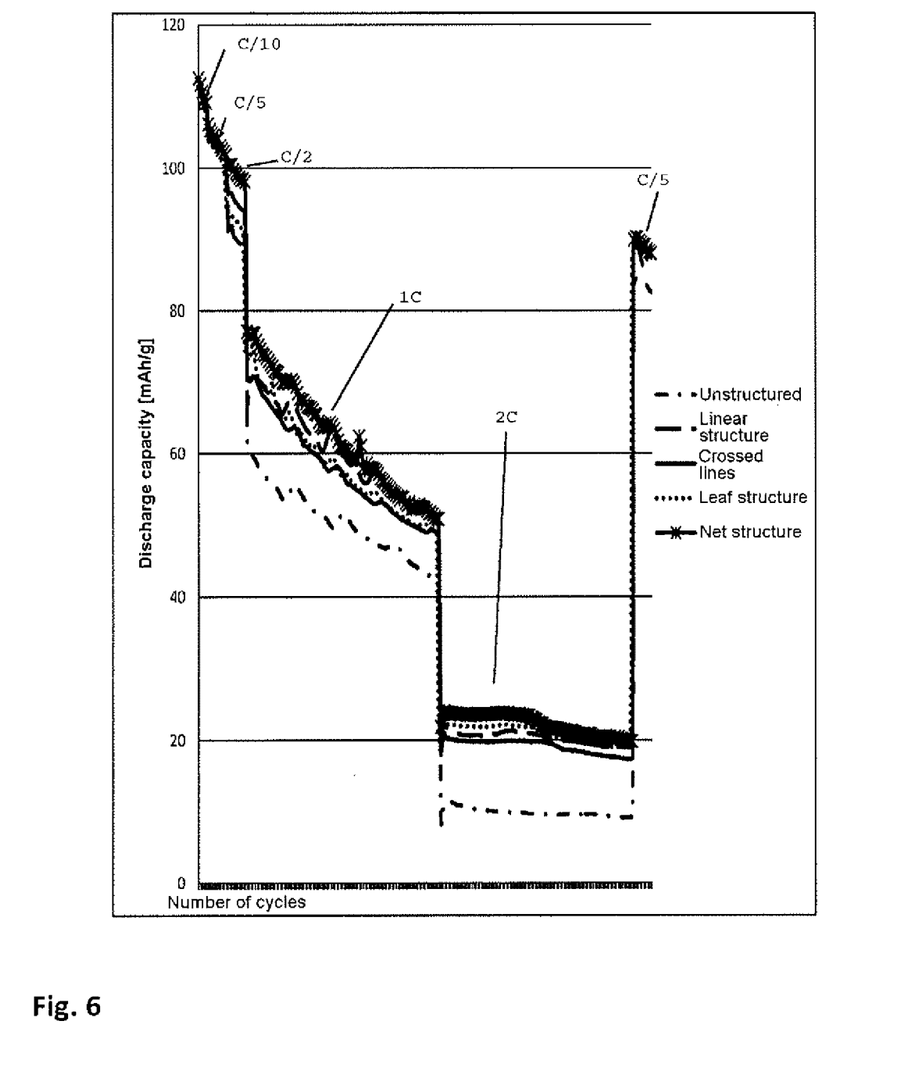
FIG. 6: discharge capacity in mAh/g as a function of the number of cycles for various fluid-conducting structures.
Figure 7:
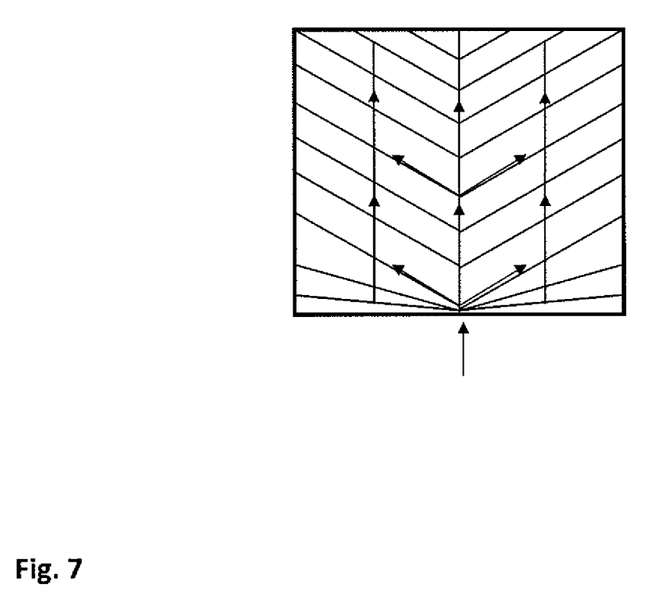
FIG. 7: electrolyte distribution in the case of point supply in a hierarchical leaf vein channel arrangement.

At the same time, it is possible to quantify that particularly high rise heights are achieved when the active electrode layer is removed with a deep structure, i.e. substantially or completely as appropriate. This is shown in FIG. 5b, 5c, 5d for a layer thickness of the active electrode material at 100 µm. It can be seen firstly that the, for attainment of an adequate rise height in the case of typical electrolyte liquids and the associated viscosities, the channel width should preferably not be significantly below at least about 35 to 40 µm. Moreover, it is apparent from FIG. 5a, in which individual points are plotted for material removal of different depth, that a high relative layer removal, i.e., more particularly, a removal down to the substrate, leads to particularly high rise heights, whereas only low rise heights are achieved in the case of relatively low layer removal. This is shown with the corresponding data in FIGS. 5c and 5d for different channel width ranges of channel width firstly about 100 µm and secondly about 45 µm. While it is preferable with regard to the fluid distribution to select channel widths between about 35 and 60 µm, greater channel widths may quite possibly be advisable. These firstly increase the reservoir of electrolyte available in the operation of the cell and they are, moreover, advantageous when hierarchical structuring or a vein-like fluid-conducting structure is selected. One example of this is shown in FIG. 7, the arrows illustrating the fluid distribution away from a filling or dripping point.

It should be mentioned that the fluid-conducting structures in the electrode material which has been studied for the compilation of FIG. 5 were produced by calendering, with selection of a manufacturing sequence in which a first partial drying operation for removal of organic, comparatively volatile solvents was followed by calendering and subsequent further drying in order to remove water. The porosity of the $LiMn_2O_4$ material studied was about 20%.

Then experiments were undertaken with different fluid-conducting structures as shown in FIG. 8. FIG. 8 shows the discharge capacity in mAh/g of electrode material which can be achieved after cycling (about 250 cycles in total are shown) with different C rates. It is apparent that, with an increasing number of cycles, through the inventive deep fluid-conducting structures, a discharge capacity greater than that of unstructured material is regularly contained. It is additionally apparent that structuring at first regularly leads to the effect that the discharge capacities are above the discharge capacities achievable with an unstructured surface. It is further evident that, through the suitable selection of a structuring such as a mesh structuring, the discharge capacities can be enhanced even further.

Typically, the generally porous layer material is applied to a substrate in a thickness of about 100 µm.

This makes it possible to dispense with costly cell storage, vacuum processes, and the downstream time-consuming heat treatment of the cells required in the prior art, which is required for homogenization of the electrolyte wetting in the electrode through lowering of the electrolyte viscosity. A further advantage of the invention is the increase in the surface-to-volume ratio of the active material, and the production of an increased electrolyte-active material interface, and the resulting improved electrochemical cyclability of the cells, especially at high charge/discharge currents.

What is claimed is:

1. An electrolyte battery electrode component including an active layer having an active material layer thickness between 30 and 150 µm, a surface adjoined by electrolyte in the battery and provided with a fluid-conducting channel structure, wherein the fluid-conducting structure has includes channels having channel depths of at least 70% of the thickness of the active layer and having channel widths of more than 35 µm and less than 150 µm.

2. The electrolyte battery electrode component of claim 1, wherein the channel structure extends toward a substrate.

3. The electrolyte battery electrode component of claim 1, wherein a multitude of channels are provided alongside one another and/or crossing one another and/or a structure branching from an electrolyte fluid inflow site and/or a column-like structure has been formed.

4. The electrolyte battery component of claim 1, wherein it constitutes a separator or an electrode, especially a cathode, preferably a thin film- and/or powder-based electrode, especially composed of at least one of $LiNi_{1/3}Mn_{1/3}Co_{1/3}O_2$, $LiCoO_2$, $LiMn_2O_4$, $LiFePO_4$, graphite, and corresponding materials with doping.

5. The electrolyte battery component of claim 1, in which the channel depth is at least 90%, of the active material layer thickness.

6. The electrolyte battery component of claim 1, wherein the channel width is at least 40 μm.

7. The electrolyte battery component of claim 1, in which the channel width is less than 80 μm.

8. A cell having an electrolyte battery component of claim 1.

9. An electrolyte battery, especially secondary element, having a component of claim 1.

10. The electrolyte battery of claim 9 with an anhydrous electrolyte.

11. A process for producing an electrolyte battery component of claim 1, wherein the structuring is undertaken with a calender roll and/or an embossing process and/or by laser.

12. The electrolyte battery component of claim 1, wherein it constitutes a separator or an electrode, especially a cathode, preferably a thin film- and/or powder-based electrode, especially composed of at least one of $LiNi_{1/3}Mn_{1/3}Co_{1/3}O_2$, $LiCoO_2$, $LiMn_2O_4$, $LiFePO_4$, graphite, and corresponding materials with doping.

13. The electrolyte battery component of claim 12, in which the channel depth is at least 90%, of the active material layer thickness.

14. The electrolyte battery component of claim 13, wherein the channel width is at least 40 μm.

15. The electrolyte battery of claim 10 including a lithium salt as the conductor salt.

16. The electrolyte battery of claim 15 including LiPF6 as the conductor salt.

17. The electrolyte battery of claim 16 including a solvent containing ethylene carbonate and/or dimethyl carbonate.

18. The cell having an electrolyte battery component of claim 8 including a lithium salt as the conductor salt, a thin film- and/or powder-based electrode composed of at least one of $LiNi_{1/3}Mn_{1/3}Co_{1/3}O_2$, $LiCoO_2$, $LiMn_2O_4$, $LiFePO_4$, graphite, and corresponding materials with doping, the layer thickness being larger than 40 μm and a solvent containing ethylene carbonate and/or dimethyl carbonate.

* * * * *